United States Patent
Vance et al.

(10) Patent No.: US 7,565,183 B2
(45) Date of Patent: Jul. 21, 2009

(54) MOBILE DEVICE WITH SELECTABLE CAMERA POSITION

(75) Inventors: Scott L. Vance, Cary, NC (US); Charles Hunt, Wake Forest, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 614 days.

(21) Appl. No.: 10/988,932

(22) Filed: Nov. 15, 2004

(65) Prior Publication Data

US 2006/0105806 A1 May 18, 2006

(51) Int. Cl.
*H04M 1/00* (2006.01)
(52) U.S. Cl. .................. 455/575.1; 455/556.1; 348/373; 379/433.13
(58) Field of Classification Search .................. 455/566, 455/569.1, 575.1, 575.3, 556.1, 556.2; 348/373–376, 348/207.99, 14.02, 14.03; 379/433.01, 433.1, 379/433.12, 433.13
See application file for complete search history.

(56) References Cited

U.S. PATENT DOCUMENTS

| | | | |
|---|---|---|---|
| 6,532,035 B1 | 3/2003 | Saari et al. | |
| 6,549,789 B1* | 4/2003 | Kfoury | 455/550.1 |
| 6,999,802 B2* | 2/2006 | Kim | 455/575.1 |
| 7,061,520 B2* | 6/2006 | Choi | 348/14.02 |
| 7,106,857 B1* | 9/2006 | Hyotylainen | 379/433.04 |
| 7,174,195 B2* | 2/2007 | Nagamine | 455/575.1 |
| 2001/0004269 A1* | 6/2001 | Shibata et al. | 348/333.06 |
| 2001/0043166 A1 | 11/2001 | Jacobsen et al. | |
| 2002/0036836 A1 | 3/2002 | Hagimori | |
| 2004/0192220 A1* | 9/2004 | Huang et al. | 455/74 |
| 2004/0203535 A1* | 10/2004 | Kim et al. | 455/90.3 |
| 2007/0082693 A1* | 4/2007 | Drucker et al. | 455/550.1 |

FOREIGN PATENT DOCUMENTS

EP  1 111 919  6/2001

(Continued)

OTHER PUBLICATIONS http://900i.nttdocomo.co.jp/main.html.

(Continued)

*Primary Examiner*—Nhan T Le
(74) *Attorney, Agent, or Firm*—Coats & Bennett, P.L.L.C.

(57) ABSTRACT

A combination mobile terminal and camera comprising a housing and a camera device integrated into a first portion of the housing. The camera device and the first portion of the housing in which the camera is integrated are moveable between a first position where the first portion of the housing is substantially aligned with a remaining second portion of the housing and a second misaligned position. In the first position, the camera may be oriented substantially parallel to a keypad, keyboard, or display in the housing. Individual buttons of a keypad on the housing may be used to control mobile terminal functions in one mode and camera functions in another mode. Certain individual buttons of the keypad may be rotatable with the camera. The alignment of the camera is such that it is possible to add additional optical elements to the optical path.

34 Claims, 8 Drawing Sheets

FOREIGN PATENT DOCUMENTS

| | | |
|---|---|---|
| EP | 1357726 | 10/2003 |
| EP | 1458169 | 9/2004 |
| JP | 2003 256819 | 9/2003 |
| WO | WO 01/31892 | 5/2001 |
| WO | WO 2004/066598 | 8/2004 |

OTHER PUBLICATIONS

PCT International Search Report, International Application No. PCT/US2005/039712, Mailed May 30, 2006.

Annex to Form PCT/ISA/206 Communication Relating to the Results of the Partial International Search, International Application No. PCT/US2005/039712, Mailed Mar. 7, 2006.

* cited by examiner

MOBILE DEVICE WITH SELECTABLE CAMERA POSITION

BACKGROUND

Combination mobile camera and communication devices, which comprise a wireless, hand-held telephone or computer and a digital camera in the same physical package, are known in the current marketplace. Cellular phones, PDAs, and BlackBerry® devices each offer packages that allow users to capture images and upload these images to a network such as the Internet. At present, many camera phones use marginal imaging components to take and upload still and moving images. The bandwidth required to upload information of this type tends to be a factor limiting the capture and transfer of quality images. Consequently, there is little impetus to incorporate within these devices more complex camera assemblies that are capable of producing high resolution images. However, Wideband Code Division Multiple Access (WCDMA) and other emerging communications technologies will soon make it possible to send high resolution digital images and live video over wireless communication networks.

Many existing mobile camera devices use a simple CMOS camera device located near, but facing away from the display screen, earpiece, or keypad of the device. This configuration allows a user to simultaneously face the image subject and see images on the display screen. Thus, the optical axis of many existing mobile camera communication devices extends in a direction perpendicular to the keyboard or display screen. This direction is aligned with the depth or thickness of the device, which is typically substantially smaller than the height and width of the device. Thus, whether the device is a clamshell design or a one-piece construction, the depth of the device in the direction of the optical axis typically limits the use of substantial optics to enhance image quality. Moveable lenses of the type that allow for wide angle or zoomed images that are typically found in conventional film and digital cameras may be too bulky to fit within the limited thickness of mobile communication devices. As a result, electronic or digital zoom operations have historically been the only zoom function available in these types of devices. Electronic and digital zoom operations typically require interpolation and other manipulation of image data, resulting in degraded images. For quality images, optical zoom is preferable to electronic zoom.

Certain mobile phone devices incorporate a camera into the hinge of a clamshell design so that the optical axis of the camera is oriented in a direction aligned with the width of the phone. However, these devices do not take full advantage of the additional space provided by the width of the device to incorporate additional optical components such as lenses, mirrors, or prisms. Consequently, even though a high quality CCD camera may be incorporated into these devices, the ability to zoom, focus, take wide angle shots, and other optical functions is still limited by fixed optics.

SUMMARY

The present invention is directed to a mobile communications device comprising a housing, a wireless transceiver disposed within said housing for transmitting and receiving signals, and a camera rotatable with respect to the housing. The camera may be integrated into a portion of the housing such that a portion of the housing rotates with the camera. The device includes a keypad having a plurality of buttons for user input. At least one button of the keypad may be rotatable with the camera. For instance, the *, 0, and # buttons of a telephone keypad may be rotatable with the camera.

The camera is rotatable between a first position where the button(s) of the keypad that are rotatable with the camera are aligned with a remainder of the keypad and a second position where the button(s) of the keypad that are rotatable with the camera are not aligned with a remainder of the keypad. In certain types of communications devices, the camera may be aligned with a display instead of a keypad in the first position. The camera may be rotatable to varying degrees about an axis substantially parallel to the keypad or to the display. The device includes a position sensor to detect a rotational position of the camera.

When the camera is positioned in the aligned position, the device may be operated in a communications mode. When the camera is positioned in the misaligned position, the device may be operated in a camera mode. The buttons of the keypad may be used to control mobile communications functions when the camera is substantially aligned with the housing. The same or different buttons of the keypad may be used to control camera functions when the camera is not substantially aligned with the housing.

The camera includes movable optical elements that may be moveable into and out of an optical path within the camera. Alternatively, the optical elements may be moveable along an optical path within the camera. The moveable optics may include an adjustable zoom, an adjustable focus, a selectable field of view or other image adjustments. Further, the optics may be mechanically or electronically adjustable.

DETAILED DESCRIPTION

Figure 1:
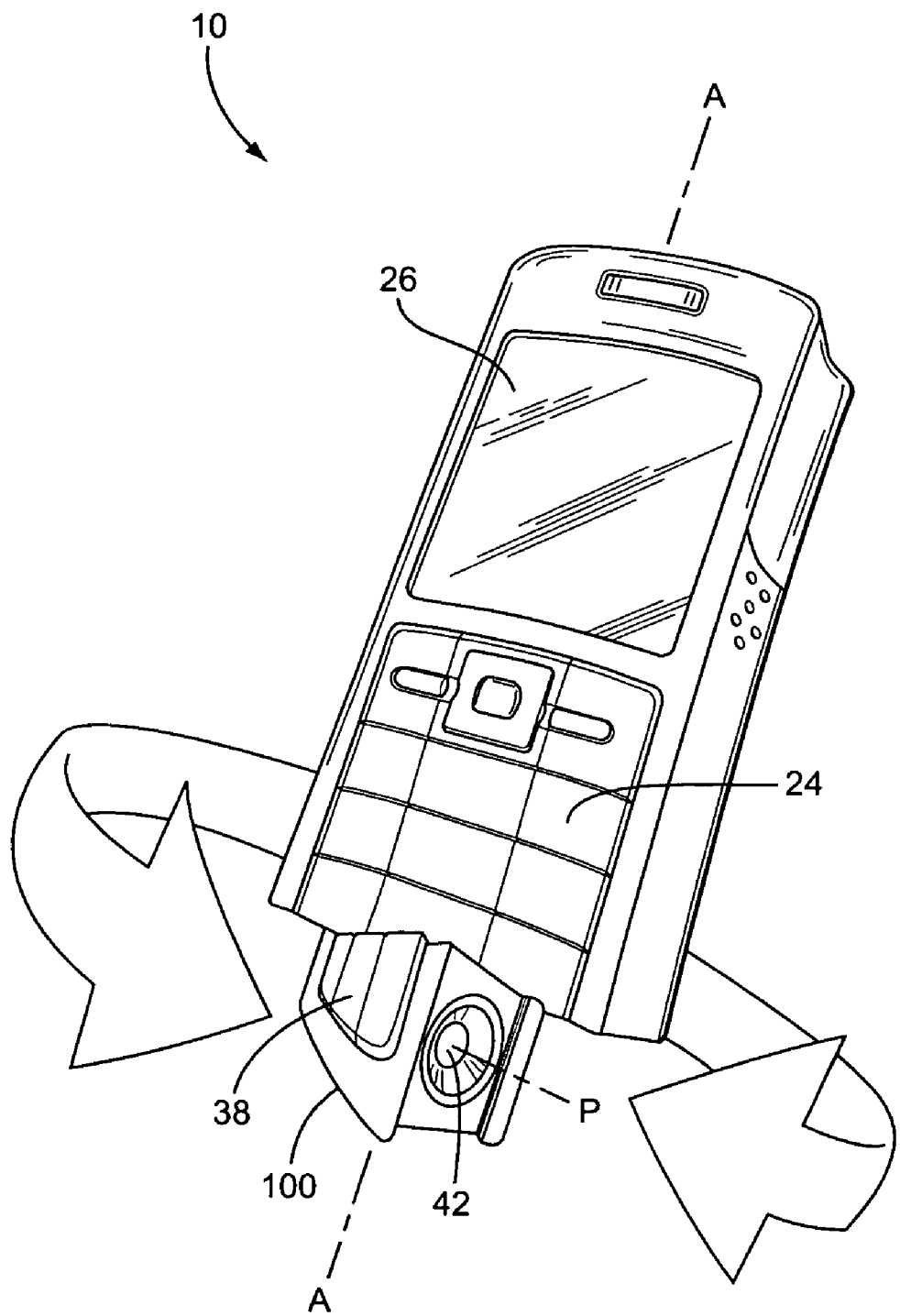
FIG. 1 is a perspective view of a combination mobile device and rotatable camera according to one embodiment of the present invention.

FIG. 1 is a perspective view of an exemplary camera device indicated generally by the numeral 10. The exemplary embodiment of the camera device comprises a camera phone, which is used as an example to describe one application of the invention. The present invention is not, however, limited to a camera phone. The present invention may be embodied in other camera devices including without limitation a digital camera, a mobile terminal, or other devices incorporating a camera. Mobile terminals may include cellular radiotelephones, personal communication services (PCS) devices, personal digital assistants (PDAs), laptop computers, BlackBerry® devices, and palm-top computers.

The exemplary camera phone 10 shown in FIG. 1 includes a conventional display 26 as is known in the art. Camera phone 10 further includes a keypad 24 that is also conventionally known except that certain buttons 38 of keypad 24 are moveable with a rotatable camera sub-assembly 100. In one embodiment, buttons 38 comprise the *, 0, and # keys of a conventional telephone keypad 24. In other mobile communication devices, the keypad 24 may consist of an alphanumeric keyboard. In the camera phone 10 shown in FIG. 1, the keypad 24 and display 26 are aligned on a common user interface panel. In other mobile devices, such as clamshell-type devices, the keypad 24 and display 26 may be located on different user interface panels.

Figure 2:
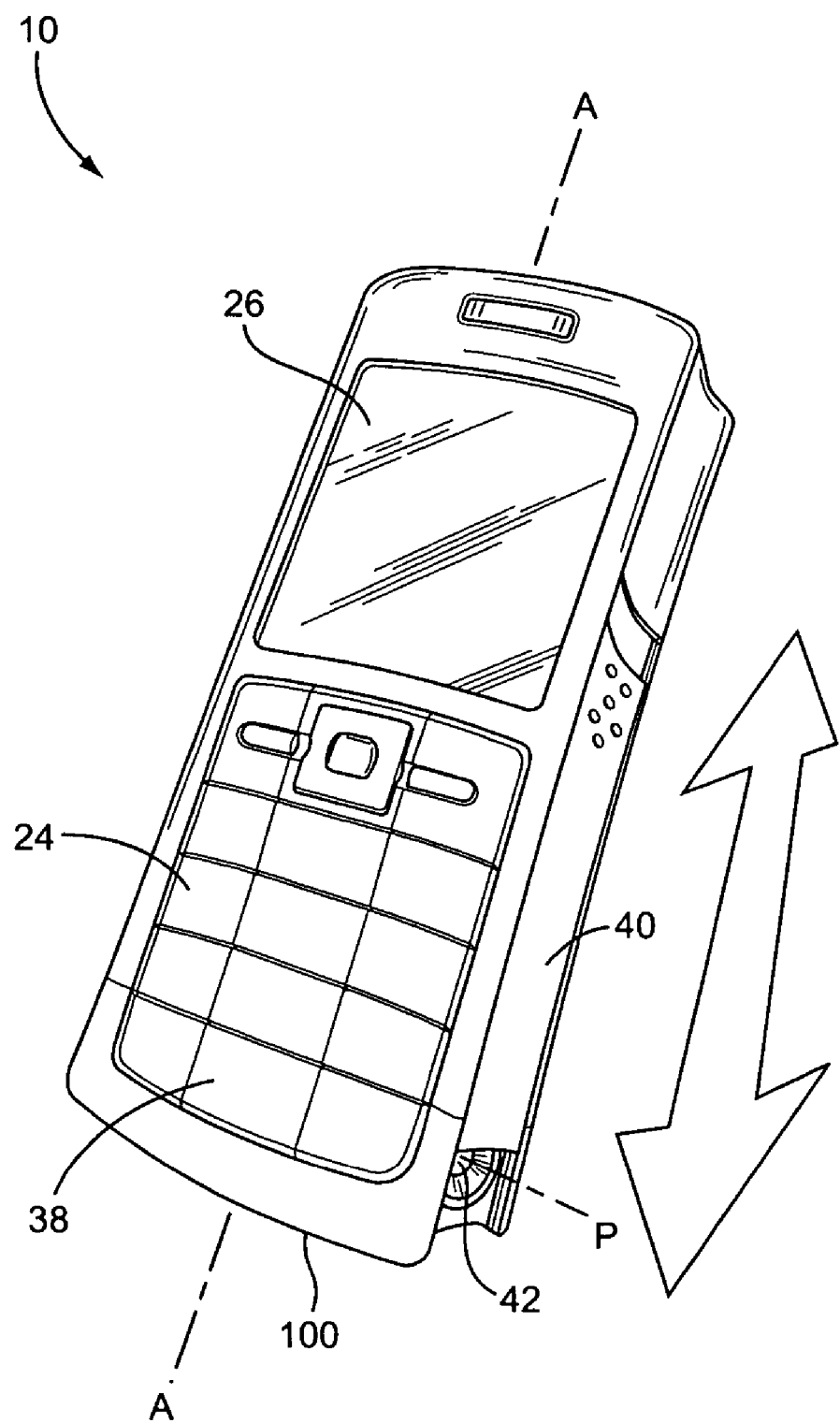
FIG. 2 is a perspective view of a combination mobile device and rotatable camera according to one embodiment of the present invention.

Camera sub-assembly 100 is rotatable or pivotable about a vertical axis A. In the embodiment shown, vertical axis A is shown aligned with a longitudinal center of the camera phone 10. In other embodiments, vertical axis A may be shifted left or right toward one lateral side of the camera phone 10. In one embodiment, the camera sub-assembly is rotatable a full 360° about axis A. In yet another embodiment, the camera sub-assembly 100 is rotatable through a range of angles from between a first position as shown in FIG. 2 to a second position displaced from this first position. For instance, the second position may be displaced approximately 90°, 180°, or 270° about axis A from the first position. The degree of rotation is certainly optionally variable.

Light enters the camera sub-assembly 100 through a window or an objective lens 42. The optical axis P of camera sub-assembly 100 is aligned with a widthwise direction of the camera phone 10 as shown in FIG. 2. The additional space available in this widthwise direction allows the camera sub-assembly 100 to include various internal components and optical elements that enhance image quality, provide flexibility in capturing images of varying fields of view, focus, and zoom angles. A more detailed description of the internals of camera sub-assembly 100 is provided below.

Figure 3:
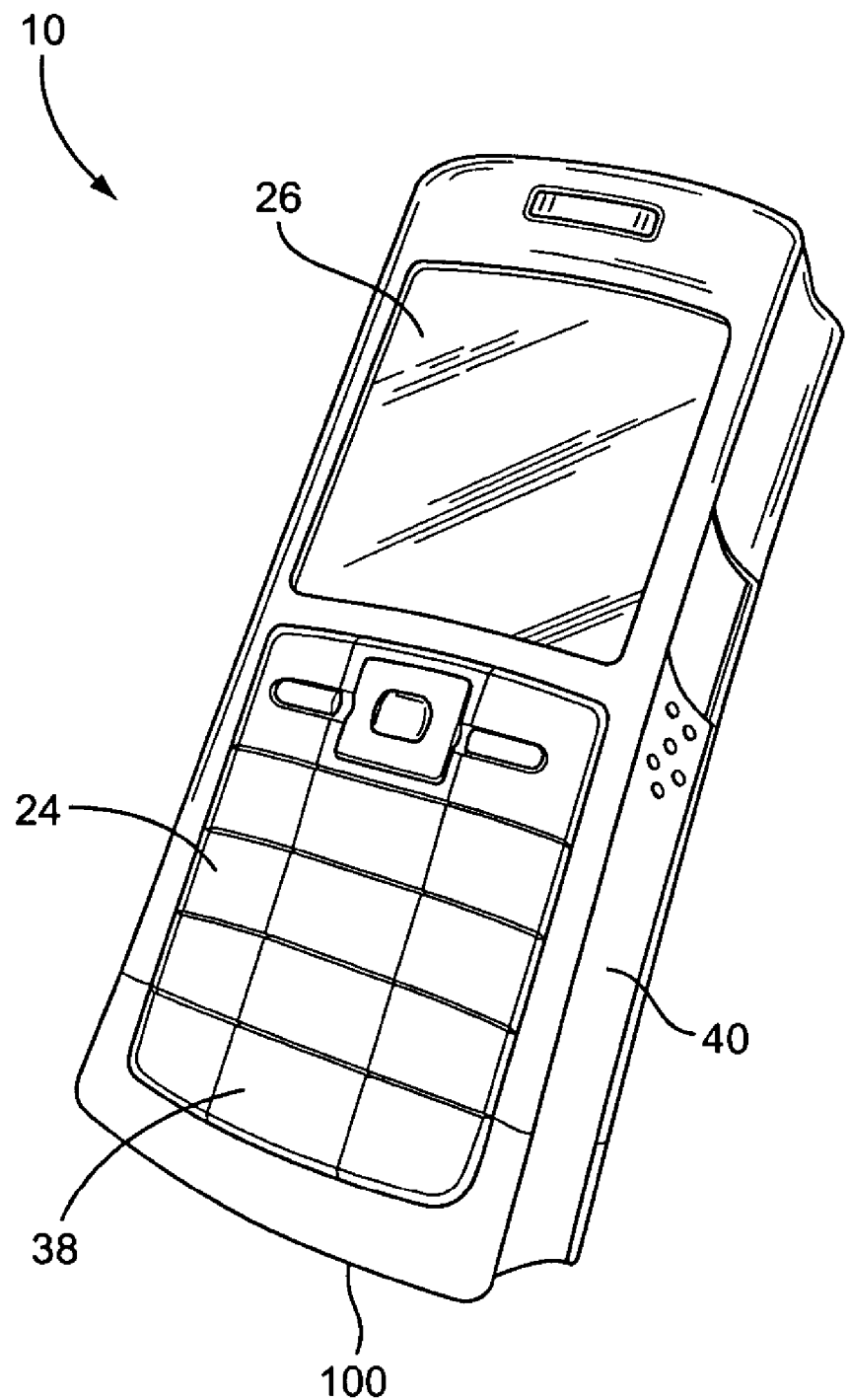
FIG. 3 is a perspective view of a combination mobile device and rotatable camera according to one embodiment of the present invention.

FIG. 2 shows the exemplary camera phone 10 oriented in generally the same position as FIG. 1, but with the camera sub-assembly 100 rotated into alignment with the remainder of the camera phone 10. In this orientation, buttons 38 on camera sub-assembly 100 are similarly brought into alignment with the remainder of the keypad 24 on the camera phone 10. In this position, a protective cover 40 may be moved over the objective lens 42 as shown in FIG. 3. Further, the protective cover 40 may lock the camera sub-assembly 100 in the position shown. A slidable cover 40 is shown in FIGS. 1-3, though those skilled in the art will comprehend that flip-type or rotatable-type covers may also be employed.

Figure 4:
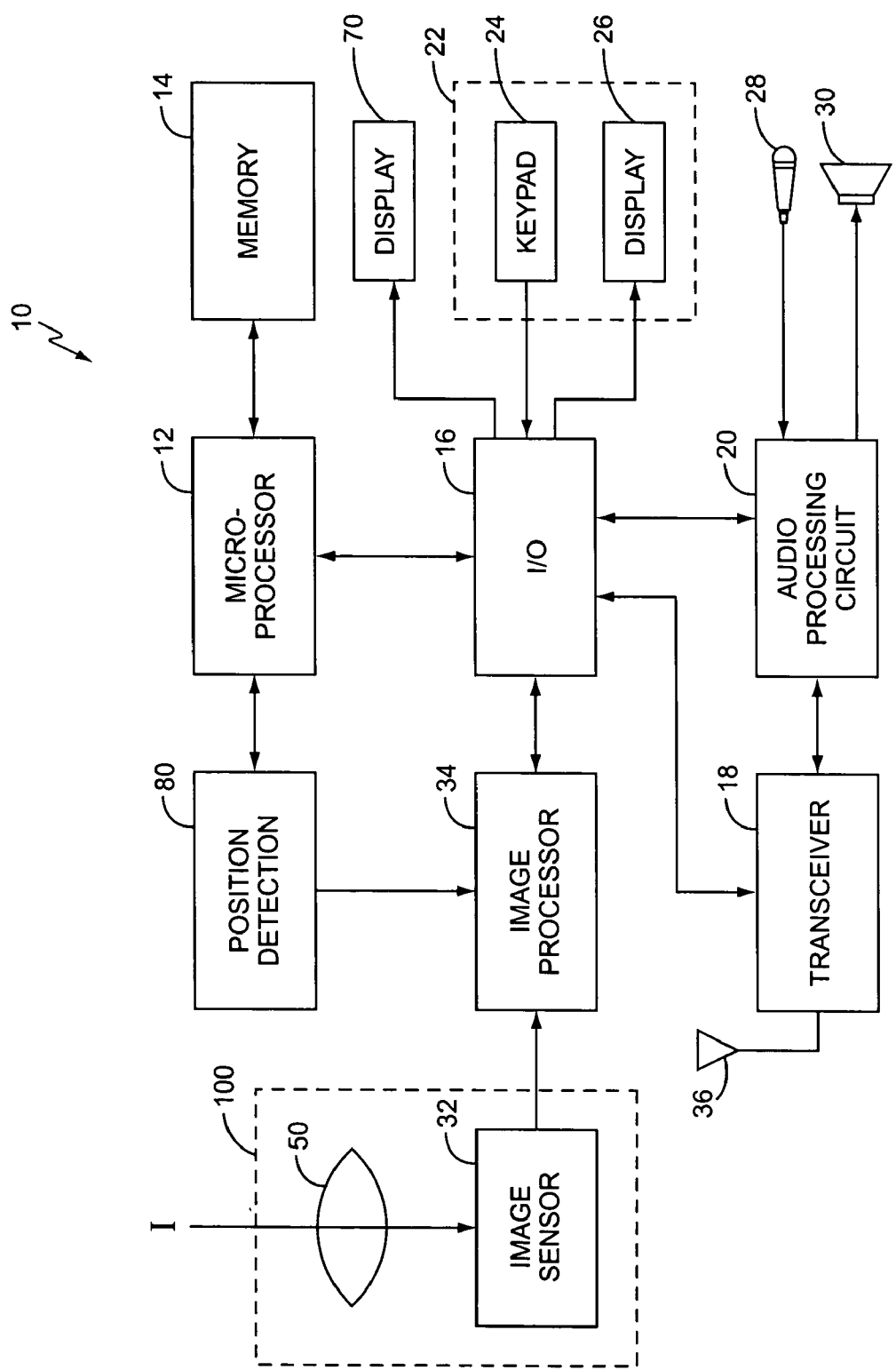
FIG. 4 is a block diagram of a combination mobile device and rotatable camera according to one embodiment of the present invention.

FIG. 4 is a block diagram of the exemplary camera phone 10. The camera phone 10 comprises a microprocessor 12, program memory 14, input/output circuit 16, transceiver 18, audio processing circuit 20, user interface 22, image sensor 32, image processor 34, and optical system 50. Microprocessor 12 controls the operation of the camera phone 10 according to programs stored in program memory 14. Input/output circuits 16 interface the microprocessor 12 with the user interface 22, transceiver 18, audio processing circuit 20, and image processing circuit 34. User interface 22 comprises a keypad 24 and a display 26. Keypad 24 allows the operator to dial numbers, enter commands, and select options. Also, in one embodiment, certain keys of keypad 24 are also used to control the function of optical system 50 as will be described in further detail below. The display 26 allows the operator to see dialed digits, call status, images or other media, and other service information. In certain mobile devices, a touchpad display combines user input and output functions. The camera phone 10 also includes a microphone 28 and speaker 30 though certain mobile communication devices, such as a PDA or palm-top computer may not have such features. Microphone 28 converts the user's speech into electrical audio signals, and speaker 30 converts audio signals into audible signals that can be heard by the user. Audio processing circuit 20 provides basic analog output signals to the speaker 30 and accept analog audio inputs from the microphone 28. Transceiver 18 is coupled to an antenna 36 for receiving and transmitting signals on a suitable communications network (not shown).

Image sensor 32 captures images formed by light impacting on the surface of the image sensor 32. The image sensor 32 may be any conventional image sensor 32, such as a charge-coupled device (CCD) or complementary metal oxide semiconductor (CMOS) image sensor. Additionally, the image sensor 32 may be embodied in the form of a modular camera assembly with or without an integrated optical system 50. Image processor 34 processes raw image data collected by the image sensor 32 for subsequent output to the display 26, storage in memory 14, or for transmission by the transceiver 18. The image processor 34 is a conventional signal microprocessor programmed to process image data, which is well known in the art. A position sensor 80 detects the position of the camera sub-assembly 100 and/or cover 40 and generates a position signal that is input to the image processor 34 and/or to the microprocessor 12. The position sensor 80 may be a limit switch, potentiometer, Hall Effect sensor or other measuring device known in the art of electronics.

Figure 5C:
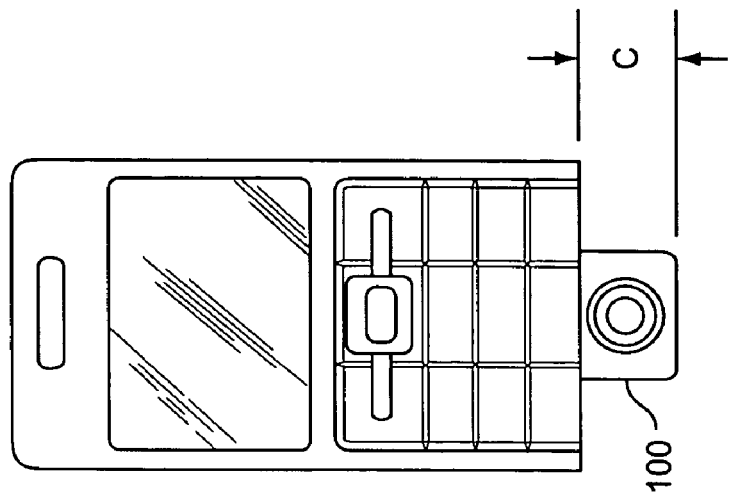
FIGS. 5A-5C are front and side views of a combination mobile device and rotatable camera according to one embodiment of the present invention.
Figure 5B:
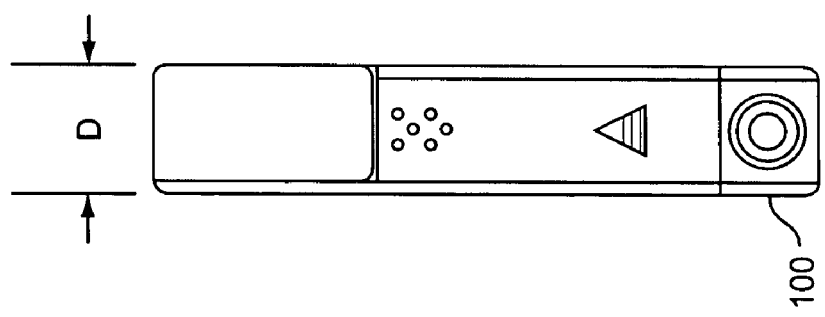
Figure 5A:
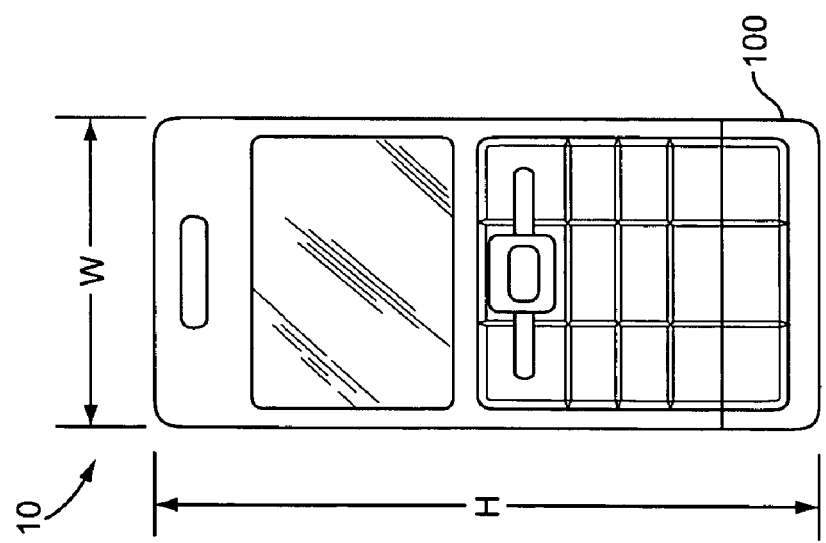

FIGS. 5A-5C show different views of the exemplary camera phone 10 oriented in a front or side view. These Figures indicate the pertinent dimensions of this particular embodiment of the camera phone 10. For instance, the height H and width W dimensions are shown in FIG. 5A. In one embodiment, the height H of the camera phone 10 may have a value in the range between about 80 and 110 millimeters. By comparison, the width W of the camera phone 10 may have a value in the range between about 35 and 45 millimeters. The depth D of the exemplary camera phone 10 (shown in FIG. 5B) may be in the range between about 7 and 25 millimeters. Finally, the height C of the camera sub-assembly 100 (shown in FIG. 5C) may be in the range between about 10 and 30 millimeters. Needless to say, as technology advances, components may become smaller and these exemplary dimensions may tend to shrink. Accordingly, these dimensions are meant to be illustrative rather than exclusive or limiting.

Figure 6:
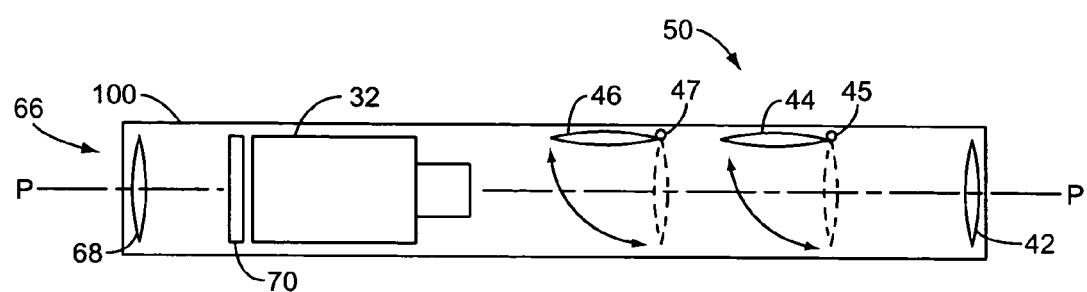
FIG. 6 is a block diagram of a camera assembly adapted for use in a combination mobile device and rotatable camera according to one embodiment of the present invention.

FIG. 6 represents a block diagram of various components of one embodiment of the camera sub-assembly 100. The camera sub-assembly 100 comprises an outermost window or objective lens 42 as previously described and shown in FIGS. 1, 2, and 5. Camera sub-assembly 100 also includes an image sensor 32, which may comprise, for example, the aforementioned CCD or CMOS array or a modular camera assembly. The camera sub-assembly 100 also includes an optical system 50 that may comprise a variety of optical elements such as lenses, mirrors, prisms, beam splitters and the like. In the embodiment shown in FIG. 6, the optical system 50 includes elements 44 and 46 that are moveable into and out of the optical path A for the purpose of altering the image directed onto the image sensor 32. For instance, the elements 44, 46 may be zoom or telephoto lenses that magnify the incident image. Elements 44, 46 may also include wide angle lenses, filtering lenses, fish eye lenses, and other optical elements known in the field of optics. The elements 44, 46 alter the incident image when rotated about pivot points 45 and 47, respectively into the position indicated by dashed lines in FIG. 6. The elements 44, 46 may be moved independent of one another to create different visual effects.

Figure 7:
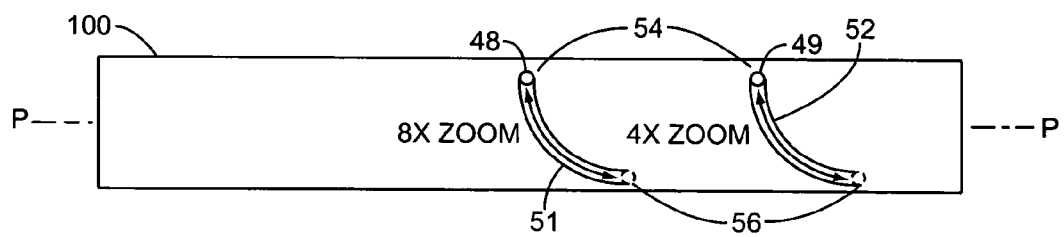
FIG. 7 is an exterior view of a camera assembly adapted for use in a combination mobile device and rotatable camera according to one embodiment of the present invention.

The elements 44, 46 may be moved manually with a mechanism that permits an end user to select the position of the elements 44, 46. One possible solution is shown in FIG. 7, where a slidable actuator 48, 49 coupled to elements 44, 46 respectively are accessible from the exterior of the camera sub-assembly 100. In one embodiment, the actuators 48, 49 are accessible at the bottom surface of the camera sub-assembly 100 and camera phone 10. The actuators 48, 49 are configured to move within a slot 51, 52, respectively, to bring elements 44, 46, respectively, into or out of the optical path A. Thus, for example, if a user wants to magnify a picture image, the actuators 48, 49 can be independently moved from a first position 54 to a second position 56. Conversely, the actuators 48, 49 may be moved back to the first position 54 to move optical elements 44, 46 out of the optical path A. Detents or other locking features as are known in the art may be provided at each position 54, 56 to secure the elements 44, 46 in the desired position.

In another embodiment of the camera sub-assembly shown in FIG. 6, the optical elements 44, 46 may be electronically actuated. That is, instead of manually changing the position of elements 44, 46 using actuators 48, 49 or some other suitable mechanism, the elements 44, 46 may be electronically repositioned with the aid of a stepper motor, solenoid, or other suitable motion translating device (not shown). To activate the element 44, 46 switching function, the end user pushes a button on the camera phone 10 to sequentially change the position of the elements and proceed through different fields of view. A dedicated button or toggle switch (not shown) may be incorporated on the exterior of the camera phone 10 to perform this function. However, in the embodiment shown in the Figures, the optical switching function may be performed using the existing keypad 24. The individual buttons of the keypad 24, including the buttons 38 located on the camera sub-assembly may have alternate context functions depending on the mode in which the camera phone 10 is operating.

Figure 8B:
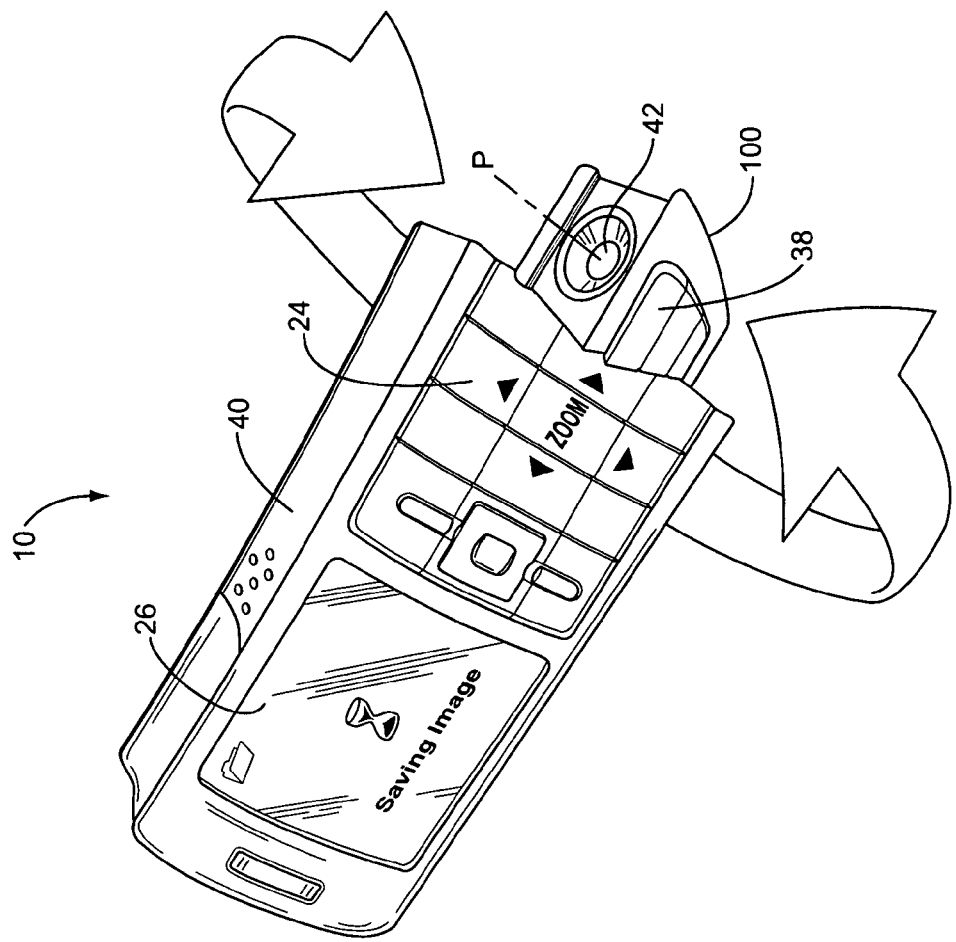
FIGS. 8A and 8B are perspective views of a combination mobile device and rotatable camera according to one embodiment of the present invention.
Figure 8A:
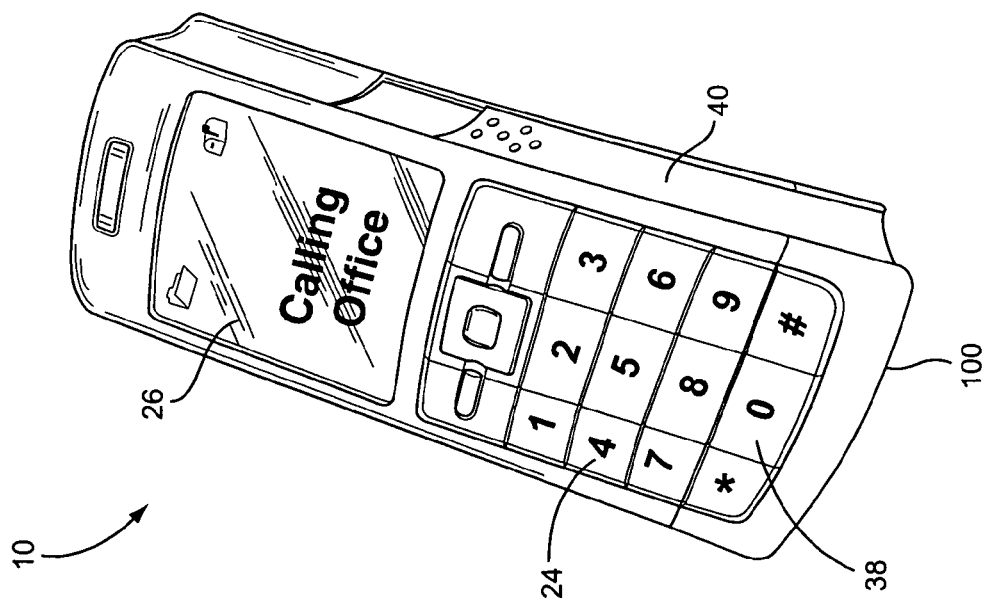

FIGS. 8A and 8B graphically depict this alternate context feature of the keypad 24. In FIG. 8A, the camera sub-assembly 100 is aligned with the remainder of the camera phone 10 and the protective cover 40 is in the closed position. As shown in FIG. 4, a position detection sensor 80 is included in the camera phone to detect the position of the camera sub-assembly 100. When the camera sub-assembly 100 is oriented in a "phone" or "communications" mode as shown in FIG. 8A, the position sensor 80 transmits this information to microprocessor 12, which controls the operation of the camera phone 10. Thus, in "phone mode," the microprocessor processes inputs from the keypad 24 and controls output to the display 26 in a manner consistent with a conventional mobile radiotelephone device.

However, in FIG. 8B, the camera sub-assembly 100 is pivoted out of alignment with the remainder of the camera phone 10. The position sensor 80 detects this displacement of the camera sub-assembly 100 and conveys this information to the microprocessor 12. Thus, in "camera mode," the microprocessor processes inputs from the keypad 24 and controls output to the display 26 in a manner consistent with a digital camera. Furthermore, based on the input from the position sensor 80, the image processor 34 may invert the incoming image as needed so that the displayed image is correctly oriented. As shown in FIG. 8B, in "camera mode," the buttons of keypad 24 and display 26 may be used to control image capture, processing, editing, and storage functions. Zoom functions may also be controlled with the buttons of keypad 24. Alternatively, it may be desirable to control some of these functions using the buttons 38 that are physically located on the camera sub-assembly 100. For example, buttons 38 may be used to more intuitively control image capture, focus, or zoom in and zoom out functions since these particular buttons 38 are aligned with primary optical axis P of camera sub-assembly 100.

In certain instances, it may be desirable to capture images while the camera sub-assembly 100 is aligned with the remainder of the camera phone 10. Thus, an alternative embodiment may have a position sensor 80 that monitors the position of protective cover 40 instead of the position of the camera sub-assembly 100. In FIG. 8A, the protective cover 40 is moved into a position to expose the objective lens 42 and allow the camera-subassembly 100 to rotate. However, in FIG. 8A, the protective cover 40 is in a closed position to cover the objective lens 42. Thus, position sensor 80 may relay cover 40 position information to the microprocessor 12, which can accordingly switch between phone and camera modes. A second position sensor (not explicitly shown) may still be used to monitor the position of camera sub-assembly 100 to direct image processor 34 to invert the incoming images as necessary.

Figure 9:
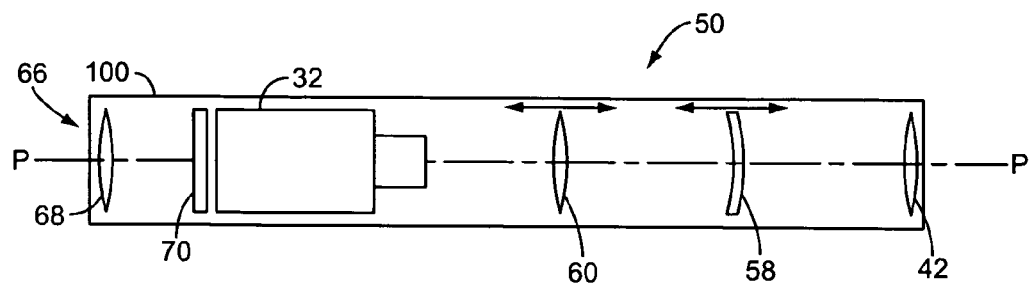
FIG. 9 is a block diagram of a camera assembly adapted for use in a combination mobile device and rotatable camera according to one embodiment of the present invention.

In contrast to the pivoting optical elements 44, 46 shown in FIGS. 6 and 7, the optical system 50 shown in FIG. 9 comprises elements 58 and 60 that are axially displaceable as indicated by the included arrows. As with the embodiment shown in FIG. 6, the optical elements 58, 60 of the embodiment shown in FIG. 9 may be moved using manual or electronic means. Electronic operation may be controlled with a dedicated actuator (not shown) or with the buttons of keypad 24, including buttons 38 on the camera sub-assembly 100 as previously described. Further, while discrete optical elements 58, 60 are shown in FIG. 9, it should be understood that modular type lens assemblies may also be used. In addition, compact fluid-filled lenses capable of altering their focal length by changing shape may also be used. One example of this type of lens is the FluidFocus lens available from Royal Philips Electronics of the Netherlands.

Figure 10:
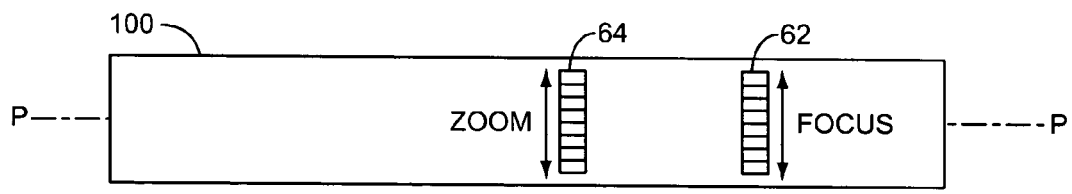
FIG. 10 is an exterior view of a camera assembly adapted for use in a combination mobile device and rotatable camera according to one embodiment of the present invention.

FIG. 10 provides one embodiment that includes actuators, such as rotary dials 62, 64 that are adapted to manually move the optical elements 58, 60 in the axial direction. Rotary dials 62, 64 may be part of a threaded assembly, such as on an SLR camera, adapted to adjust the position of the optical elements 58, 60. In one embodiment, one rotary dial 62 is adapted to adjust the magnification or zoom of the optical assembly 50 while another rotary dial 64 is adapted to adjust the focus of the optical assembly. In another embodiment, the camera sub-assembly may include a single adjustment dial 62 or 64 or other actuator to adjust the position of one or more optical elements 58, 60. This single actuator 62 or 64 may be adapted to adjust zoom or focus or some combination of the two.

Referring again to FIG. 6, the camera sub-assembly 100 may also include a viewfinder 66, which allows the end user to see an approximation of the image that is being directed onto the image sensor 32. The viewfinder 66 comprises a window or lens 68 and display device 70 such as an LCD or plasma display. The display device 70 may be coupled to the input/output circuit 16 shown in FIG. 4 to duplicate the image delivered to main display 26. Alternatively, display device 70 may simply duplicate the image detected by image sensor 32 without displaying additional information. In yet another alternative embodiment, display device 70 may show the image detected by image sensor 32 in conjunction with additional information, such as focus mode, light strength, zoom power, and other similar indicators relevant to the camera function. The viewfinder 66 display device may be used in conjunction with or in lieu of the main display 26. For instance, an end user may elect to look through the viewfinder 66 and capture an image while the camera phone 10 is powered off or while the main display 26 is turned off to conserve battery power.

Figure 11:
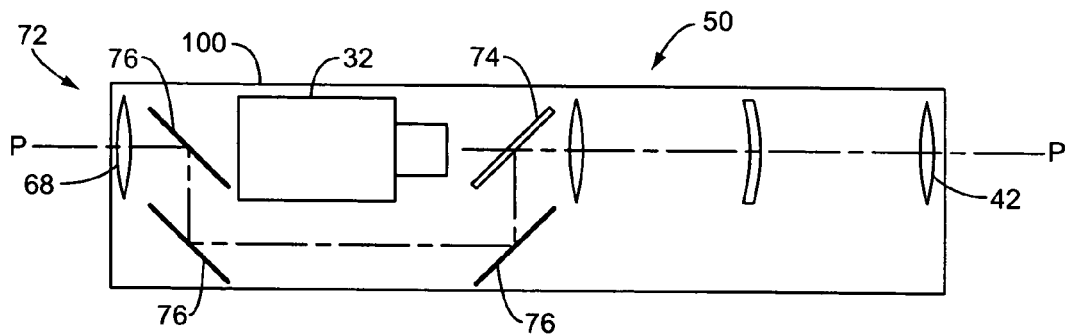
FIG. 11 is a block diagram of a camera assembly adapted for use in a combination mobile device and rotatable camera according to one embodiment of the present invention.

FIG. 11 shows an alternative embodiment of viewfinder 72 that uses a more conventional approach for viewing the image subjects. Viewfinder 72 comprises a beamsplitter 74 and a series of mirrors 76 to project the actual image received by image sensor 32 through the viewfinder window 68. Beamsplitter 74 is an optical element known in the art of optics adapted to allow part of an incident light wave to pass through while reflecting the other part. Thus, the beamsplitter 74 allows the same image to reach the image sensor 32 and the viewfinder 72.

The present invention may be carried out in other specific ways than those herein set forth without departing from the scope and essential characteristics of the invention. For instance, the camera phone 10 portrayed in the Figures has been depicted with the moveable camera sub-assembly 100 positioned at the bottom of the camera phone 10 and rotating about a vertical axis P of the camera phone 10. In other applications, such as with handheld computers, it may be desirable to position a camera sub-assembly 100 at a left or right side of the device and rotatable about a horizontal axis. The additional volume available in either a width or height direction of such devices allows for flexible positioning of the camera sub-assembly 100 within the device. The present embodiments are, therefore, to be considered in all respects as illustrative and not restrictive, and all changes coming within the meaning and equivalency range of the appended claims are intended to be embraced therein.

What is claimed is:

1. A combination mobile terminal and camera comprising:
    a housing comprising first and second portions, said first portion movable relative to the second portion between first and second positions;
    a wireless transceiver disposed within said housing for transmitting and receiving signals;
    a keypad including a first button disposed on the first portion of the housing and a second button disposed on the second portion of the housing, and wherein the first and second buttons of the keypad are aligned when the first portion of the housing is in the first position and are misaligned when the first portion of the housing is in the second position;
    a camera device integrated into the first portion of the housing and movable with the first portion of the housing between first and second positions.

2. The combination mobile terminal and camera of claim 1 wherein the first button controls mobile terminal functions when the camera device is in the first position and the first button controls camera functions when the camera device is in the second position.

3. The combination mobile terminal and camera of claim 1 wherein the second button controls mobile terminal functions when the camera device is in the first position and the second button controls camera functions when the camera device is in the second position.

4. The combination mobile terminal and camera of claim 1 wherein the first button comprises one of the *, 0, and # buttons of a telephone keypad.

5. The combination mobile terminal and camera of claim 1 wherein the camera device comprises selectable optics.

6. The combination mobile terminal and camera of claim 5 wherein the selectable optics comprises an adjustable zoom.

7. The combination mobile terminal and camera of claim 5 wherein the selectable optics comprises an adjustable focus.

8. The combination mobile terminal and camera of claim 5 wherein the selectable optics comprises a selectable field of view.

9. The combination mobile terminal and camera of claim 5 wherein the selectable optical elements are moveable into and out of an optical path within the camera.

10. The combination mobile terminal and camera of claim 9 wherein the selectable optical elements are electronically moveable.

11. The combination mobile terminal and camera of claim 9 wherein the selectable optical elements are manually moveable.

12. The combination mobile terminal and camera of claim 5 wherein the selectable optical elements are moveable along an optical path within the camera.

13. The combination mobile terminal and camera of claim 5 wherein the selectable optics comprises a movable lens.

14. The combination mobile terminal and camera of claim 1 further comprising a display, and when the first position is substantially aligned with the second portion of the housing, the camera is oriented substantially parallel to the display.

15. The combination mobile terminal and camera of claim 1 wherein the camera device further comprises a viewfinder.

16. The combination mobile terminal and camera of claim 15 wherein the viewfinder comprises an LCD display.

17. The combination mobile terminal and camera of claim 15 wherein the viewfinder comprises a beamsplitter for viewing images directed through the camera.

18. The combination mobile terminal and camera of claim 1 further comprising a position sensor to detect a rotational position of the camera device.

19. The combination mobile terminal and camera of claim 1 wherein the camera device is rotatable 360° about an axis substantially parallel to the keypad.

20. The combination mobile terminal and camera of claim 1 wherein the camera device is rotatable through a range of approximately 90° or more about an axis substantially parallel to the keypad.

21. A method for selectively operating a mobile communications device comprising first and second housing portions, said first housing portion movable relative to the second housing portion between first and second positions, said method comprising:
    providing a rotatable camera in the first housing portion of mobile communications device for selectively capturing images from a plurality of directions;
    providing a keypad on the mobile communications device comprising a first button disposed on the first housing portion and a second button disposed on the second housing portion;
    positioning the rotatable camera in a first position in which the first and second buttons are substantially aligned to operate the mobile communications device in a communications mode; and positioning the rotatable camera in a second position in which the first and second buttons are substantially misaligned to operate the mobile communications device in a camera mode.

22. The method of claim 21 further comprising sensing the position of the rotatable camera to selectively operate the mobile communications device in one of the communications mode or the camera mode.

23. The method of claim 21 wherein positioning the rotatable camera in the first position comprises orienting the camera to be substantially parallel to the keypad of the mobile communications device.

24. The method of claim 21 wherein positioning the rotatable camera in the first position comprises orienting the camera to be substantially parallel to a display of the mobile communications device.

25. The method of claim 21 further comprising disposing selectable optics in the camera.

26. The method of claim 25 further comprising adjusting the selectable optics to adjust a zoom level.

27. The method of claim 25 further comprising adjusting the selectable optics to adjust a focus level.

28. The method of claim 25 further comprising adjusting selectable optics to switch optical elements into or out of an optical path of the camera.

29. The method of claim 25 further comprising adjusting the selectable optics with the individual buttons of the keypad.

30. The method of claim 25 further comprising manually adjusting the selectable optics with actuators.

31. The method of claim 21 further comprising displaying mobile terminal graphics on a display when the camera is in the first position, and displaying camera graphics on the same display when the camera is in the second position.

32. The method of claim 21 further comprising uncovering an objective lens of the camera before positioning the camera in the second position.

33. The method of claim 21 further comprising covering an objective lens of the camera after positioning the camera in the first position.

34. The method of claim 21 further comprising adjusting the selectable optics to move the optical elements along an optical path of the camera.

* * * * *